(12) United States Patent
Schessel (10) Patent No.: US 7,729,344 B2
(45) Date of Patent: Jun. 1, 2010

(54) METHODS AND APPARATUS FOR CONTROLLING SIGNALING ASSOCIATED WITH A PRIVATE BRANCH EXCHANGE WITHIN A SESSION OVER INTERNET PROTOCOL NETWORK

(75) Inventor: Larry E. Schessel, Cary, NC (US)

(73) Assignee: GENBAND Inc., Plano, TX (US)

( * ) Notice: Subject to any disclaimer, the term of this patent is extended or adjusted under 35 U.S.C. 154(b) by 0 days.

(21) Appl. No.: 11/692,375

(22) Filed: Mar. 28, 2007

(65) Prior Publication Data
US 2008/0159268 A1 Jul. 3, 2008

Related U.S. Application Data

(60) Provisional application No. 60/882,717, filed on Dec. 29, 2006.

(51) Int. Cl.
*H04L 12/66* (2006.01)

(52) U.S. Cl. ............ 370/354; 370/230; 370/235; 370/236; 370/237; 370/238; 370/351; 370/352; 370/353; 370/355; 370/356; 370/360; 370/400; 379/93.14; 379/93.15; 379/221.15; 379/225; 379/258; 709/201; 709/202; 709/203; 709/223; 709/243

(58) Field of Classification Search ......... 370/351–356, 370/230, 235–238, 360, 400; 379/93.14–93.15, 379/221.15, 225, 258; 709/201–203, 223–226, 709/243–244
See application file for complete search history.

(56) References Cited

U.S. PATENT DOCUMENTS

| | | | | |
|---|---|---|---|---|
| 6,289,010 B1 * | 9/2001 | Voit et al. | ............ | 370/352 |
| 6,339,594 B1 * | 1/2002 | Civanlar et al. | ............ | 370/352 |
| 6,493,337 B1 * | 12/2002 | Stevenson, III | ............ | 370/352 |
| 6,636,508 B1 * | 10/2003 | Li et al. | ............ | 370/389 |
| 6,775,269 B1 | 8/2004 | Kaczmarczyk et al. | | |

(Continued)

FOREIGN PATENT DOCUMENTS

WO  WO 2004/080018 A1 *  9/2004

OTHER PUBLICATIONS

Notification of Transmittal of the International Search Report and the Written Opinion of the International Searching Authority, or the Declaration of International Application No. PCT/US07/68128 (Aug. 15, 2008).

(Continued)

*Primary Examiner*—Hemant Patel
(74) *Attorney, Agent, or Firm*—Jenkins, Wilson, Taylor & Hunt, P.A.

(57) ABSTRACT

A method includes receiving a media signal at an interface device in communication with and disposed between an Internet Protocol private branch exchange (IP-PBX) and a first endpoint. The media signal is associated with the first endpoint and is associated with a session established between the first endpoint and a second endpoint within a session over internet protocol network. The session is established at least in part by the IP-PBX based on a session control signal received at the interface device from the first endpoint and sent from the interface device to the IP-PBX. The method also includes modifying the media signal at the interface device based on a per-device service associated with at least one of the first endpoint or the second endpoint.

19 Claims, 6 Drawing Sheets

U.S. PATENT DOCUMENTS

| | | | |
|---|---|---|---|
| 6,781,983 B1 * | 8/2004 | Armistead | 370/353 |
| 6,937,596 B2 * | 8/2005 | Sjolund et al. | 370/352 |
| 7,167,467 B2 * | 1/2007 | Iwami et al. | 370/352 |
| 7,466,691 B2 * | 12/2008 | Piercy et al. | 370/352 |
| 2001/0005382 A1 * | 6/2001 | Cave et al. | 370/466 |
| 2002/0176404 A1 * | 11/2002 | Girard | 370/352 |
| 2003/0072300 A1 * | 4/2003 | Kwon | 370/352 |
| 2004/0066923 A1 * | 4/2004 | Robinson | 379/166 |
| 2004/0072593 A1 | 4/2004 | Robbins et al. | |
| 2004/0081307 A1 * | 4/2004 | Fujiwara et al. | 379/220.01 |
| 2004/0109438 A1 * | 6/2004 | Chen | 370/352 |
| 2004/0156491 A1 | 8/2004 | Reding et al. | |
| 2004/0170268 A1 * | 9/2004 | Hakusui | 379/211.02 |
| 2004/0190500 A1 * | 9/2004 | Wratten | 370/352 |
| 2004/0264482 A1 * | 12/2004 | Kang et al. | 370/401 |
| 2004/0266426 A1 | 12/2004 | Marsh et al. | |
| 2005/0129069 A1 * | 6/2005 | Binder | 370/493 |
| 2006/0030357 A1 * | 2/2006 | McConnell et al. | 455/554.1 |
| 2006/0067298 A1 * | 3/2006 | Houck et al. | 370/352 |
| 2007/0086444 A1 * | 4/2007 | Binder | 370/352 |
| 2007/0116043 A1 | 5/2007 | MeLampy et al. | |
| 2007/0206585 A1 * | 9/2007 | Lee | 370/356 |
| 2007/0209059 A1 * | 9/2007 | Moore et al. | 726/2 |
| 2007/0217399 A1 * | 9/2007 | Joseph et al. | 370/356 |

OTHER PUBLICATIONS

Office Action for U.S. Appl. No. 11/692,375 (Jul. 3, 2008).

Stephen Hayes, "IP Based Multimedia services Platform," Ericsson, ITU-T IMT-2000 and Beyond, Ottawa, CN (May 28, 2002).

* cited by examiner

METHODS AND APPARATUS FOR CONTROLLING SIGNALING ASSOCIATED WITH A PRIVATE BRANCH EXCHANGE WITHIN A SESSION OVER INTERNET PROTOCOL NETWORK

RELATED APPLICATION

The present application claims priority to the commonly owned U.S. Provisional Patent Application No. 60/882,717, entitled "Methods and Apparatus for Controlling Signaling Associated with an Enterprise Private Branch Exchange within a Session over Internet Protocol Network," filed on Dec. 29, 2006, which is incorporated herein by reference in its entirety.

BACKGROUND

One or more embodiments of the invention relate generally to an enterprise Internet Protocol private branch exchange (IP-PBX), and, in particular, to methods and apparatus related to an interface device configured to control signals between an IP-PBX and an endpoint.

IP-PBX's are typically configured to process calls initiated by an endpoint (e.g., wireline phone and cell phone) based on a finite set of standard and proprietary session control protocols and/or media signal protocols. Consequently, an IP-PBX may not be able to process a call initiated by an endpoint that operates based on a set of session control protocols and/or media signal protocols that is not compatible with the IP-PBX. In other words, the IP-PBX may not be able to perform one or more per-call services (e.g., call forwarding) and per-device services (e.g., per-endpoint registration) for the endpoint. Even if an IP-PBX is configured such that the IP-PBX is compatible with a set of endpoints, implementing both per-call services and per-devices services for the set of endpoints can be inefficient or limited in feature functionality. For example, per-device services that are processor intensive can dominate the computing resources of the IP-PBX and reduce the ability of the IP-PBX to efficiently implement per-call services. Thus, a need exists for a method and apparatus for processing and interworking signals exchanged between an IP-PBX and an endpoint.

SUMMARY OF THE INVENTION

A method includes receiving a media signal at an interface device in communication with and disposed between an Internet Protocol private branch exchange (IP-PBX) and a first endpoint. The media signal is associated with the first endpoint and is associated with a session established between the first endpoint and a second endpoint within a session over internet protocol network. The session is established at least in part by the IP-PBX based on a session control signal received at the interface device from the first endpoint and sent from the interface device to the IP-PBX. The method also includes modifying the media signal at the interface device based on a per-device service associated with at least one of the first endpoint or the second endpoint.

DETAILED DESCRIPTION

An interface device (also referred to as a concentrator or an Internet Protocol (IP) concentrator) is a session over Internet Protocol (SoIP) network device that can be configured, for example, to function as an interface between endpoints (e.g., IP communication devices) of a SoIP network on one hand and an IP-private branch exchange (IP-PBX) on the other hand. The SoIP network can be a voice over Internet Protocol (VoIP) network and/or a media over Internet Protocol (MoIP) network. Specifically, the interface device can be configured, for example, to receive and/or send ingress and/or egress signals transmitted between endpoints and an IP-PBX (e.g., enterprise IP-PBX). From the perspective of the IP-PBX, ingress signals are signals sent from the endpoint in the direction of the IP-PBX and egress signals are signals sent from the IP-PBX in the direction of the endpoints. The interface device can receive, process (e.g., modify, analyze), and/or send any combination of signals associated with a call initiated by multiple types of endpoints (e.g., IP phone, personal computer) that can operate based on one or more different types of signaling protocols (e.g., proprietary protocols). The signals can be session control signals (e.g., session initiation protocol (SIP) messages) and/or media signals (e.g., media IP packets).

Because the interface device can be configured to function as a point of entry for ingress and/or egress signaling associated with the IP-PBX, the interface device can affect the processing performed by the IP-PBX. For example, the interface device can forward ingress session control signals originating at the endpoints for processing at the IP-PBX while processing, at the interface device, ingress media signals originating at the endpoints without forwarding them to the IP-PBX. The interface device can also be configured to handle interoperability between the endpoints and the IP-PBX.

The interface device can also be configured to execute one or more per-device services and/or one or more per-call services associated with a call and/or an endpoint. Per-device services can be, for example, services that are related to a specific endpoint and/or related to a media signal from a specific endpoint. Per-call services can be, for example, services related to processing session initial signals of a call regardless of the type of endpoint that sends the session control signals.

In some embodiments, the interface device can be configured to control signals such that per-device services associated with a call and/or an endpoint are performed by the interface device and per-call services (also referred to as global call-related services) associated with the call and/or the endpoint are performed by the IP-PBX. In some embodiments, an IP-PBX can be configured to handle only per-call services and can be configured to operate with one or more interface devices that are configured to handle per-device services.

Figure 1:
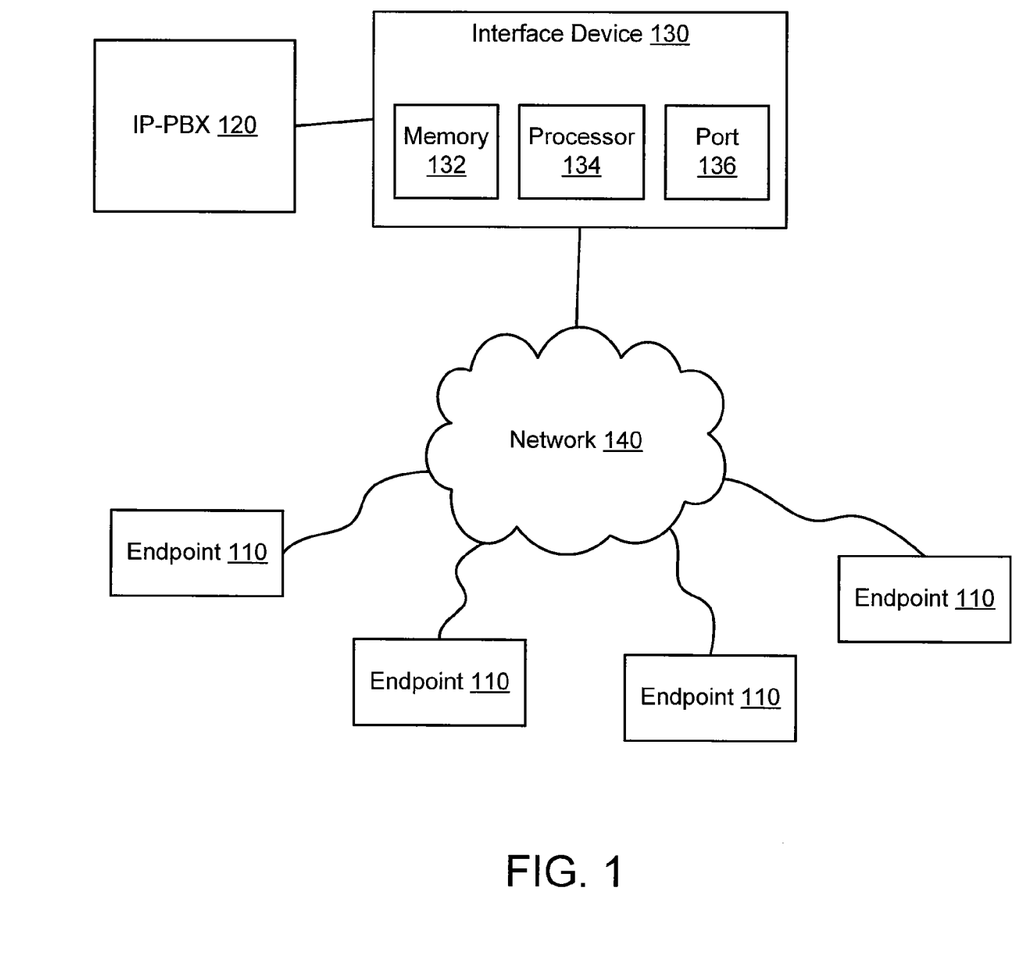
FIG. 1 is a schematic diagram that illustrates an interface device functioning as an interface between multiple endpoints and an IP-PBX, according to an embodiment of the invention.

FIG. 1 is a schematic diagram that illustrates an interface device 130 functioning as an interface between multiple endpoints 110 and an IP-PBX 120, according to an embodiment of the invention. The endpoints 110 are devices or collections of devices configured to send and/or receive session control signals and/or media signals over network 140. The session control signals can be used, for example, to establish (or terminate) a session between at least two endpoints 110. After the session has been established, the endpoints 110 can exchange media signals until the session is closed. The endpoints 110 can be, for example, an individual phone, a computer terminal, a video conferencing device, an IP phone, and/or an access point to another network such as a separate SoIP network (not shown). The network 140 can be, for example, a wired and/or a wireless SoIP network configured with one or more segments, switches, routers, and so forth.

The interface device 130 can be configured to function as an interface between the endpoints 110 and the IP-PBX 120 by intercepting and processing ingress and/or egress session control signals and/or media signals transmitted between the endpoints 110 and the IP-PBX 120. For example, the interface device 130 can receive a signal from an endpoint 110 and send the signal to the IP-PBX 120 after modifying the signal. From the perspective of the IP-PBX 120, ingress signals are signals transmitted from any of the endpoints 110 in the direction of the IP-PBX 120 including signals modified by the interface device 130 and signals passing through the interface device 130 without modification. From the perspective of the IP-PBX 120, egress signals are signals transmitted from the IP-PBX 120 in the direction of any of the endpoints 110.

Although FIG. 1 shows the IP-PBX 120 only connected to the interface device 130, in some embodiments the IP-PBX 120 can also be connected to network 140. In other embodiments, the IP-PBX 120 can be connected to the interface device 130 through network 140 such that the interface device 130 is a virtual point of entry for ingress and/or egress signaling associated with the IP-PBX 120.

The interface device 130, as a point of entry for ingress and/or egress signaling associated with the IP-PBX 120, can affect the processing performed by the IP-PBX 120 by forwarding selected signals and/or portions of signals to the IP-PBX 120 with or without modifying the signals. In other words, the interface device 130 can limit the number and/or type of signals sent to the IP-PBX 120 for processing. A processor 134 of the interface device 130 can be used to perform signal processing at the interface device 130. For example, the interface device 130 can forward an ingress session control signal originating at one of the endpoints 110 to the IP-PBX 120. When the session control signal is received at the IP-PBX 120, the IP-PBX 120 can process the session control signal, for example, to establish a session. The interface device 130 can also, for example, process at the interface device 130, an ingress media signal originating at a particular endpoint 110 without forwarding the media signal to the IP-PBX 120. In some embodiments, the processor 134 can be a processor system. Session control signals and/or media signals can be received via port 136 which can be an input port and/or an output port.

The interface device 130 (e.g., processor 134 of the interface device 130) can be configured to process signals such that one or more per-device services are performed at the interface device 130 while one or more per-call services are performed at the IP-PBX 120. Because media signals can typically be processed (e.g., modified) using per-device services and session control signals can typically be processed (e.g., modified) using per-call services, the interface device 130 can increase per-device processing at the interface device 130 by increasing the processing of media signals at the interface device 130. The increase in processing of per-device services at the interface device 130 can result in a modification of the ratio of processing using per-call services versus processing using per-device service at the IP-PBX 120 because processing using per-device services will be performed at the interface device 130 rather than at the IP-PBX 120.

Per-device services can be, for example, services that are associated with a particular type of endpoint 110 (e.g., specific brand of IP phone) or associated with one or more signals associated with a particular endpoint 110. Per-device services include, for example, device registration services, device monitoring services (e.g., status monitoring services), processing of device keep-alive messages, protocol interworking services, per-call channel management services, media routing services, text to voice conversion services (e.g., using a specified protocol associated with a device), media interworking services, and device security processing services. A particular per-device service, such as a text messaging service using a proprietary protocol, can be made available at an interface device 130 to several of the endpoints 110 that are compatible with the particular per-device service.

Per-call services (also can be referred to as global call services) can be, for example, services that are used to process session control signals and/or are services triggered by session control signals. Per-call services can be used for substantially any call/session within a network regardless of the type of endpoint that initiates and/or receives the call/session. Per-call services include, for example, call routing, per-call digit translation, feature processing, call forwarding, call waiting, and call transferring.

The interface device 130 can be configured to receive a signal (e.g., egress signal or ingress signal) and modify the signal before sending the signal to a separate device such as one of the endpoints 110 and/or the IP-PBX 120. The interface device 130 can be configured to modify the signal, for example, to enable interoperability between one or more of the endpoints 110 and the IP-PBX 120. For example, the interface device 130 can receive a text-based media signal from an endpoint 110 and can convert the text-based media signal into a voice-based media signal before forwarding the media signal to the IP-PBX 120. In some embodiments, the interface device 130 can be configured to translate/convert signaling protocols (e.g., media signaling protocols and/or session control signaling protocols) used by some endpoints 110 and/or the IP-PBX 120 into different signaling protocols used by other endpoints 110 and/or the IP-PBX 120 so that the endpoints 110 and IP-PBX 120 can communicate with one another. For example, the interface device 130 can be configured to translate a proprietary session control protocol used by one of the endpoints 110 into a standard session control protocol that can be recognized and processed by the IP-PBX 120 and vice versa.

The interface device 130 can be configured to analyze at least a portion of a signal received at the interface device 130 based on one or more conditions and/or policies stored in memory 132. The interface device 130 can, for example, modify at least a portion of the signal based on the analysis of the signal. For example, conditions and/or policies stored in the memory 132 can be used to determine whether to forward a signal (e.g., session control signal, media signal) to the IP-PBX 120 with or without modifying the signal by, for example, translating the signal into a different protocol. In some embodiments, the processing of a session control protocol signal and/or media signal can be triggered by a condition and/or policy based on the type of endpoint 110 that produced and sent the session control protocol signal and/or media signal.

Figure 2:
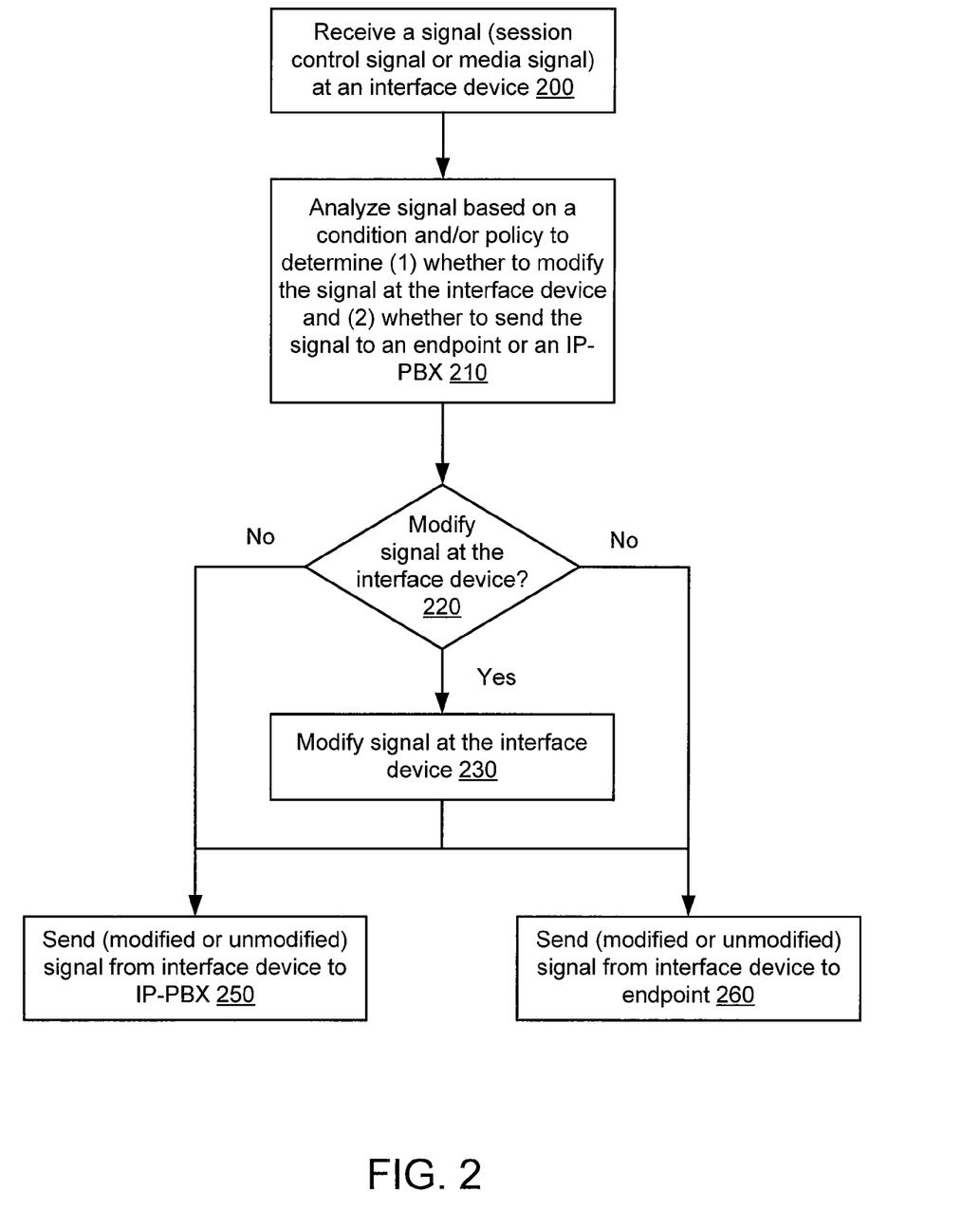
FIG. 2 is a flowchart that illustrates a method for processing signals received at an interface device, according to an embodiment of the invention.

FIG. 2 is a flowchart that illustrates a method for processing (e.g., receiving, modifying, sending) one or more signals received at an interface device, according to an embodiment of the invention. The flowchart illustrates that a signal is received at an interface device at 200. The signal can be an ingress session control protocol signal and/or an ingress media signal. In this embodiment, an ingress signal is a signal transmitted from an endpoint in the direction of an IP-PBX. The signal can also be an egress session control protocol signal and/or an egress media signal. In this embodiment, an egress signal is a signal transmitted from an IP-PBX in the direction of an endpoint.

The signal is analyzed based on a condition and/or a policy at 210 to determine (1) whether to modify the signal at the interface device and (2) whether to send the signal from the interface device to the IP-PBX or to an endpoint. The condition and/or policy can be accessed at, for example, a memory and/or a database in communication with the interface device. For example, the interface device can determine that a particular media signal from a first endpoint type (e.g., cell phone) should be modified before the signal is sent to a second endpoint of a different type. These determinations can be made based on one or more policies that indicate that any media signals originating at the first endpoint type should be modified and forwarded to a second endpoint of a different type without being processed at, for example, an IP-PBX. The signal can be modified at the interface device, for example, based on a per-device service (e.g., text-to-voice conversion) associated with the first endpoint type.

If it is determined that the signal is to be modified at the interface device at 220 based on the analysis at 210, the signal is modified at the interface device at 230. The media signal can be, for example, modified by compressing the media signal at the interface device. After the signal is modified at the interface device at 230, the modified signal can be forwarded to the IP-PBX at 250 or the endpoint at 260 based on the analysis at 210. Also, based on the analysis at 210, the signal can be sent (e.g., forwarded) from the interface device to the IP-PBX at 250 without being modified at the interface device at 230 or sent (e.g., forwarded) from the interface device to the endpoint at 260 without being modified at the interface device at 230.

Although the blocks in the flowchart shown in FIG. 2 are in a particular order, many of the blocks can be performed in any order. For example, modification of a signal at the interface device can be performed before it is determined that a signal is to be sent, for example, to an IP-PBX.

Figure 3:
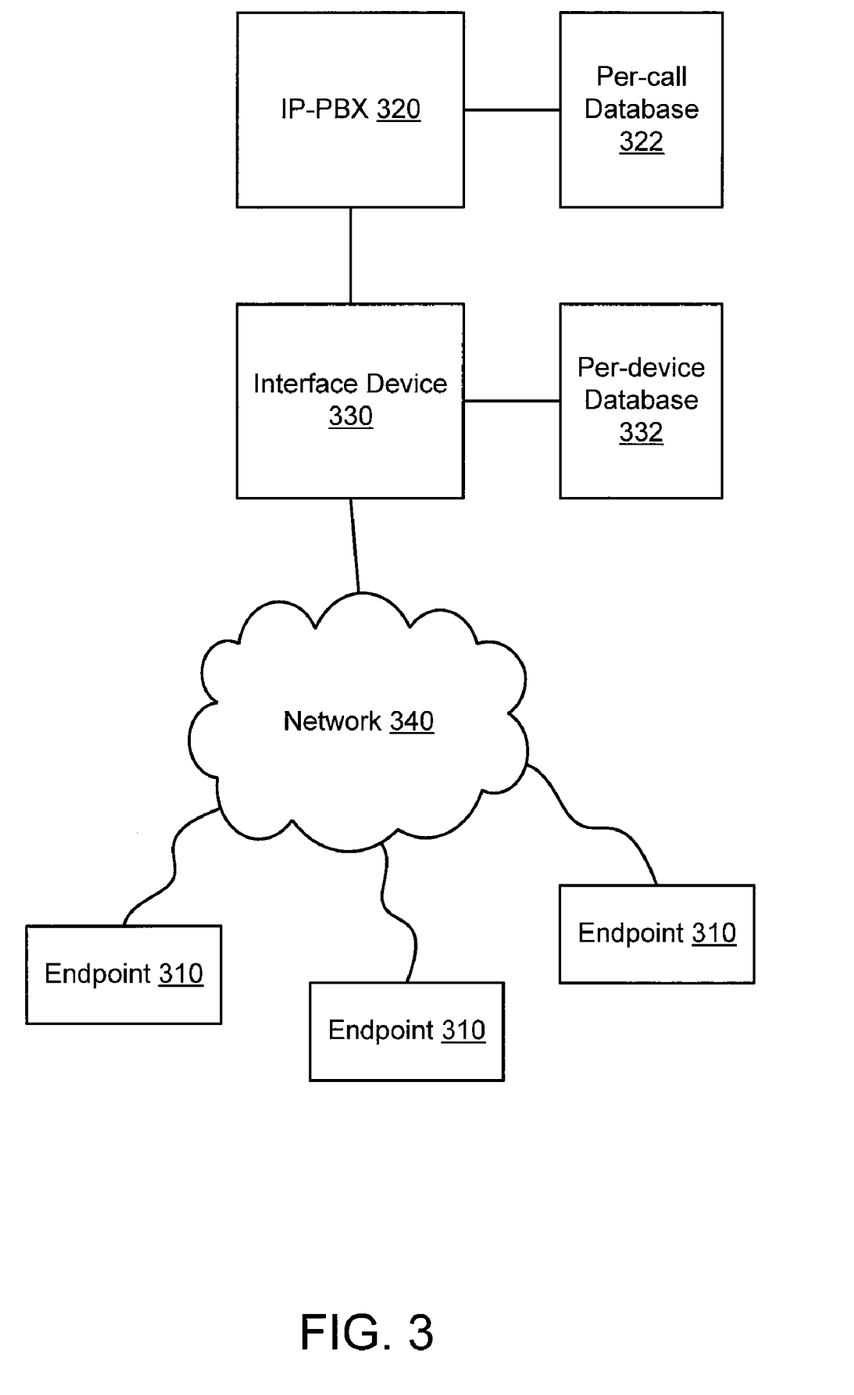
FIG. 3 is a schematic diagram that illustrates an interface device configured to perform per-device services and an IP-PBX configured to perform per-call services, according to an embodiment of the invention.

FIG. 3 is a schematic diagram that illustrates an interface device 330 configured to perform per-device services and an IP-PBX 320 configured to perform per-call services, according to an embodiment of the invention. The interface device 330 is configured to function as an interface between multiple endpoints 310 and an IP-PBX 320. The endpoints 310 are devices or collections of devices configured to send and/or receive session control signals and/or media signals over network 340. The interface device 330, in this embodiment, is configured to function as an interface between the endpoints 310 and the IP-PBX 320 by receiving, sending, and/or modifying session control signals and/or media signals transmitted between the endpoints 310 and the IP-PBX 320.

The interface device 330, in this embodiment, is configured to control the number and/or type of signals sent to the IP-PBX 320 such that substantially all per-call functions are performed by the IP-PBX 320 and substantially all per-device functions are performed by the interface device 330. For example, the interface device 330 can forward session control signals to the IP-PBX 320 so that the IP-PBX 320 can perform per-call services in response to the session control signals (e.g., forward a call). The interface device 330 can perform per-device services associated with the media signals without sending (e.g., forwarding) the media signals to the IP-PBX 320.

The interface device 330, as a device that is substantially dedicated to performing per-device service associated with the endpoints 310, can be referred to as a per-device interface device. The IP-PBX 320, as a device that is substantially dedicated to performing per-call services, can be referred to as a per-call IP-PBX. In some embodiments, the IP-PBX 320 can be an IP-PBX 320 configured to perform both per-call services and per-device services, but substantially limited to performing per-call services by the functions performed by interface device 330.

As shown in FIG. 3, the interface device 330 is in communication with a per-device database 332. The per-device database 332 includes endpoint-related data that can be used by the interface device 330 to perform per-device services. The per-device database 332 can include, for example, endpoint capability data, endpoint status parameter values, endpoint registration information, endpoint protocol information, endpoint security information, and/or endpoint feature information. For example, the endpoint protocol information can be used by the interface device 330 to determine whether or not a particular endpoint 310 can recognize and process a media signal modified at the interface device 330 using, for example, a specified per-device protocol modification service.

The interface device 330 can be configured to perform a per-device service based on an application that is executed at the interface device 330, and the per-device database 332 can be accessed and/or used to implement preferences associated with a specific endpoint 310 with respect to the per-device service. Information in the per-device database 332, such as endpoint feature information, can be used to determine which per-device services are available to a particular endpoint 310. For example, if a user of a particular endpoint 310 has not subscribed to a specified per-device service, an indicator that the particular endpoint 310 has not subscribed to the specified per-device service can be stored in the per-device database 332. The indicator can be accessed by the interface device 330 from the per-device database 332 and used to trigger the interface device 330 to deny the particular endpoint 310 access to the specified per-device service.

Also, as shown in FIG. 3, the IP-PBX 320 is in communication with a per-call database 322. The per-call database 322 includes IP-PBX-related data and/or per-call data that can be used by the IP-PBX 320 to perform per-call services. IP-PBX-related data can include, for example, IP-PBX channel data and IP-PBX protocol information. Per-call data includes, for example, call forwarding information, call forwarding instructions, call transferring information and/or call transferring instructions. The IP-PBX 320 can be configured to perform per-call services based on an application that is executed at the IP-PBX 320. The data stored in the per-call database 322 can be used, for example, to implement preferences for a specific user and/or call.

Because the per-device services and per-call services are performed on separate devices, a per-device service executed at the interface device 330 can be executed such that the per-device services will have little or no impact on per-call services executed by the IP-PBX 320 and vice versa. In other words, per-call services can be, for example, executed at the IP-PBX 320 such that computing resources associated with the interface device 330 can be allocated to processing of per-device services rather than processing of per-call services.

Also, based on the architecture shown in FIG. 3, signals from endpoints 310 that may require specific per-device service processing can be handled at the interface device 330 and sent to the IP-PBX 320 for processing using per-call services (e.g., call forwarding) that are typically not endpoint-specific. In other words, the interface device 330 can handle endpoint-specific interoperability for each of the endpoints 310 such that interoperability issues are not visible to the IP-PBX 320 that is configured to handle generic per-call processing using per-call services.

Also, because the per-device services and per-call services are performed using separate devices and databases, a per-device service can be modified and/or added using the interface device 330 and/or the per-device database 332 with little or no impact on processing associated with the IP-PBX 320 and/or per-call database 322 and vice versa. For example, if a new endpoint 310 is added to the network 340, data related to the new endpoint 310, for example, can be added to the per-device database 332 without substantially impacting processing performed by the IP-PBX 320 and/or processing associated with per-call database 322. A per-device service can also be added to the interface device 330 without substantially impacting processing performed by the IP-PBX 320 and/or processing associated with per-call database 322. The per-device service can be added without substantially integrating and/or associating the per-device service, for example, with a per-call service.

Likewise, a new per-call service and/or feature can be added to the IP-PBX 320 and/or per-call database 322 without substantially impacting processing performed by the interface device 330 and/or processing associated with per-device database 332. For example, new call forwarding information can be added to the per-call database 322 independent of the interface device 330 and/or per-device database 332. The per-call service can be added without substantially integrating and/or associating the per-call service, for example, with a per-device service.

Figure 4:
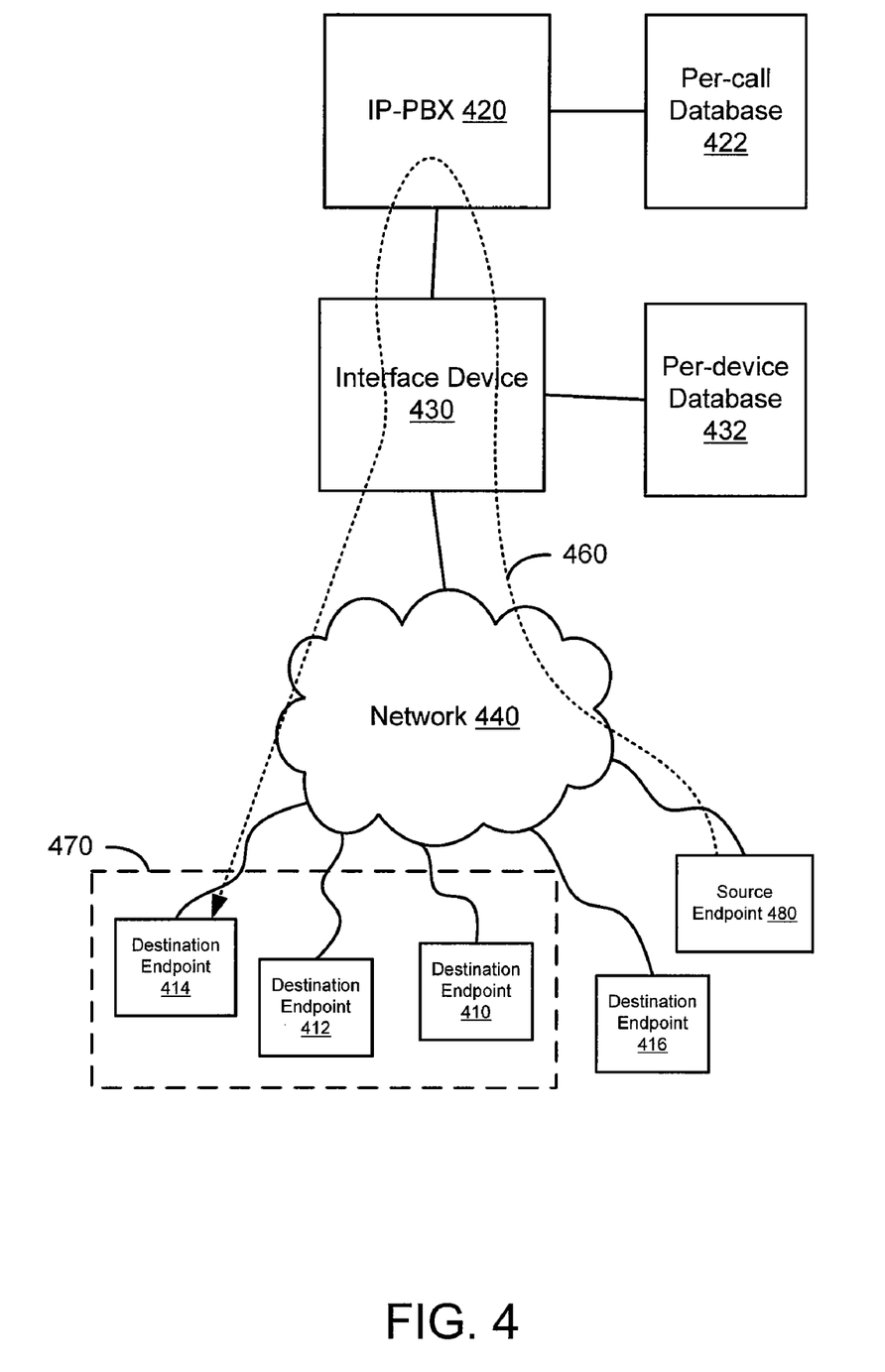
FIG. 4 is a schematic diagram that illustrates an interface device configured to perform a per-device service for a group of endpoints and an IP-PBX configured to perform per-call services, according to an embodiment of the invention.

FIG. 4 is a schematic diagram that illustrates an interface device 430 configured to perform a per-device service for a group of endpoints 470 and an IP-PBX 420 configured to perform per-call services, according to an embodiment of the invention. The interface device 430, IP-PBX 420, and databases 422 and 432 are configured similar to the interface device 330, IP-PBX 320, and databases 322 and 332 shown in FIG. 3. A source endpoint 410 and several destination endpoints 410, 412, 414 and 416 are in communication with network 440. As shown in FIG. 4, the source endpoint 480 sends a session control signal(s) 460 so that a session can be established with destination endpoint 414.

The destination endpoints 410, 412, and 414 are included in a group of destination endpoints 470 (also referred to as a group or cluster of endpoints) as defined within the per-device database 432. Because the group of destination endpoints 470 is defined within the per-device database 432, the association of the destination endpoints 410, 412, and 414 can be detected by the interface device 430 without being visible to the IP-PBX 420. The destination endpoints 410, 412, and 414 can be defined as a group 470 by an owner of each of the destination endpoints 410, 412, and 414. For example, destination endpoint 410 can be a cell-phone, destination endpoint 412 can be a personal digital assistant (PDA), and destination endpoint 414 can be a personal computer that are all associated with a single user.

The group of destination endpoints 470 can be associated with an instruction(s) and/or condition(s) in the per-device database 432 such that when a session cannot be established with any one of the endpoints (e.g., destination endpoint 414) within the group 470, a session attempt can be initiated by the interface device 430 with another endpoint (e.g., destination endpoint 412) within the group 470. Because the group 470 is defined within the per-device database 432, additional attempts by the interface device 430 to establish a session with the endpoints 410, 412, and/or 414 within the group 470 may not be visible to the IP-PBX 420. In other words, the group 470 definition may not be made available to the IP-PBX 420. For example, if a first attempt to establish a session based on session control signal 460 with destination endpoint 414 fails because destination endpoint 414 is not functional (e.g., turned-off), interface device 430 can initiate a second attempt to establish a session with destination endpoint 412 from the group 470 rather than immediately sending a call rejection to the source endpoint 460. Computing resources at the IP-PBX 420 may not be used to initiate the second attempt. In some embodiments, the interface device 430 can be configured to simultaneously attempt to establish a session with more than one of the endpoints 410, 412, and 414 and establish the session with the first of the endpoints 410, 412, or 414 to respond.

In some embodiments, the destination endpoints 410, 412, and/or 414 within the group 470 can operate based on one or more different session control protocols and/or media signal types. The interface device 430 can be configured to translate the protocols and/or media signals types, as necessary, based on data in the per-device database 432 so that a connection can be established between the source endpoint 480 and at least one of the destination endpoints 410, 412, and/or 414 within the group 470. In other words, the interface device 430 can handle interoperability for each of the destination endpoints 410, 412, and/or 414 within the group 470 such that interoperability issues are not visible to the IP-PBX 420 and/or source endpoint 480.

In some embodiments, a user and/or network administrator can define rules and/or instructions associated with one or more per-device services that can be executed by the interface device 430. For example, one or more groups can be defined by a user (or network administrator) and stored in the per-device database 432 using a web-based user-interface (not shown). Additional rules, such a prioritization rules and/or instructions can be associated with one or more of the groups and can be defined by, for example, a user.

Figure 5:
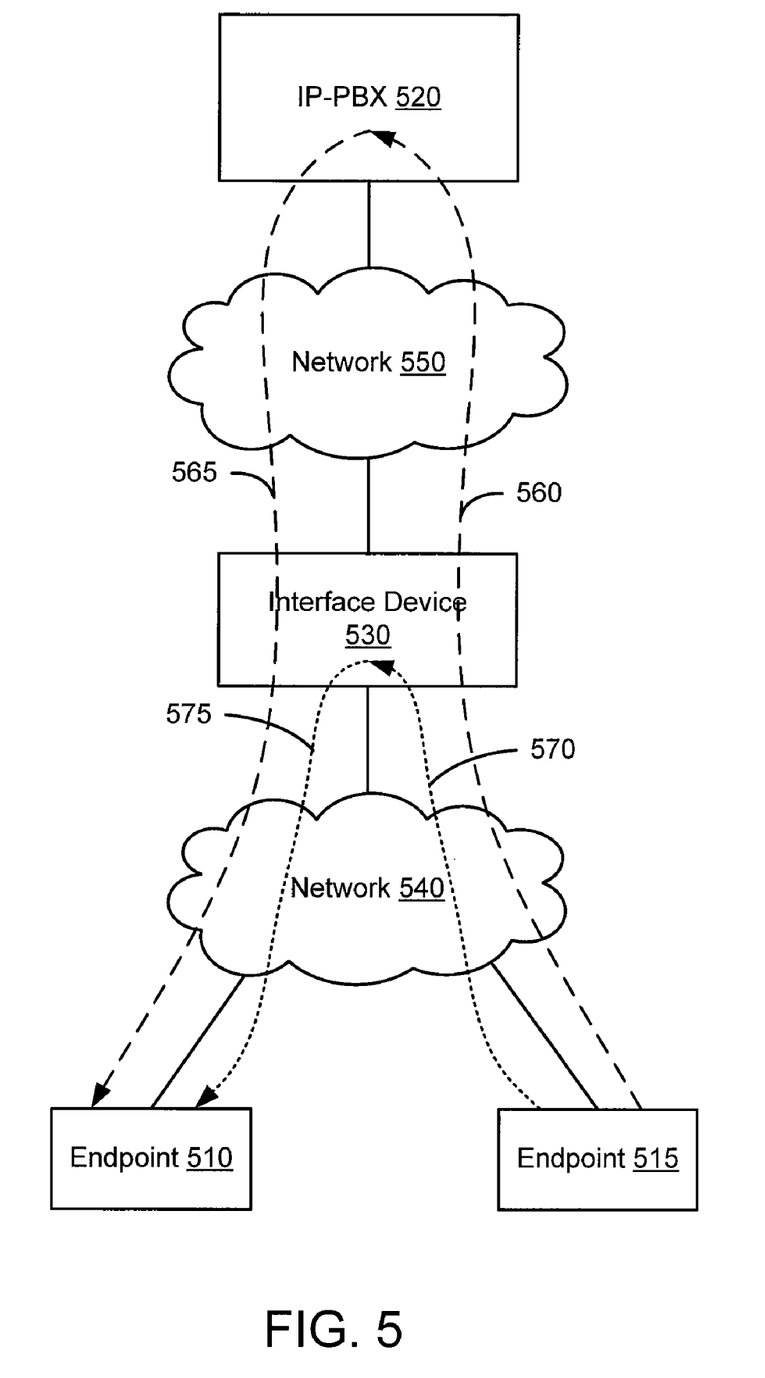
FIG. 5 is a schematic diagram that illustrates an interface device and an IP-PBX sending, receiving, and/or otherwise processing session control signals and media signals, according to an embodiment of the invention.

FIG. 5 is a schematic diagram that illustrates an interface device 530 and an IP-PBX 520 sending, receiving, and/or otherwise processing session control signals and media signals, according to an embodiment of the invention. The interface device 530 is configured to function as an interface between the IP-PBX 520 and endpoints 510 and 515. The interface device 530 is configured to affect processing performed at the interface device 530 and/or the IP-PBX 520 by controlling session control signaling and media signaling between the IP-PBX 520 and the endpoints 510 and 515.

The endpoints 510 and 515 are devices configured to send and/or receive session control signals and/or media signals.

The endpoints 510 and 515 are in communication with the interface device 530 via network 540, and the interface device 530 is in communication with the IP-PBX 520 via network 550. For purposes of concision, only signals (e.g., session control signals, media signals) originating at endpoint 515 and terminating at endpoint 510 are shown (signals originating at endpoint 510 and terminating at endpoint 515 are omitted from FIG. 5).

The interface device 530, in this embodiment, is configured to intercept and modify the ingress media signal 570 before sending the modified ingress media signal 570 as an egress media signal 575 to endpoint 510. The ingress media signal 570 can be modified at the interface device 530 using a per-device service such as, for example, a text-to-voice conversion service. For example, the interface device 530 can use the text-to-voice conversion service to convert the ingress media signal 570 from a media signal with text-based content to egress media signal 575 that has voice-based content.

The modification of the ingress media signal 570 using the per-device service can be based on the capabilities of the endpoints 510 and 515. For example, the per-device service can be selected from a set of per-device services such that the ingress media signal 570 can be converted from, for example, a media signal protocol associated with endpoint 515 and to a media signal compatible with endpoint 510. The compatibility of the per-device service can be determined based on data accessed from a per-device database (not shown). The media signals 570 and 575 are processed at the interface device 530 without forwarding any portion of the media signals 570 and/or 575 to the IP-PBX 520.

As shown in FIG. 5, the ingress session control signal 560 is sent (e.g., forwarded) to the IP-PBX 520 and the egress session control signal 565 from the IP-PBX 520 is sent (e.g., forwarded) to the endpoint 510. In this embodiment, the ingress session control signal 560 and the egress session control signal 565 are sent without being modified at the interface device 530. In some embodiments, the interface device 530 can be configured to determine that a signal is a session control signal based on, for example, a header associated with the signal or an analysis of at least a portion of the content of the signal. In some embodiments, the interface device 530 can be configured to immediately send the signal without modification when it is determined that the signal is a session control protocol signal.

In some embodiments, the IP-PBX 520, endpoint 510, and/or endpoint 515 can be configured to operate based on different session control protocols. If the IP-PBX 520, endpoint 510, and/or endpoint 515 operate based on different session control protocols, the interface device 530 can be configured to translate the ingress session control signal 560 and/or the egress session control signal 565 into a different session control protocol. For example, the interface device 530 can be configured to translate the ingress session control protocol signal 560 received from the endpoint 515 into a session control protocol that can be processed by the IP-PBX 520 before the ingress session control signal 560 is sent to the IP-PBX 520. Also, the interface device 530 can be configured to translate the egress session control protocol signal 565 received from the IP-PBX 520 into a session control protocol that can be recognized by the endpoint 510 before sending the egress session control signal 565 to endpoint 510. In some embodiments, an interface device, such as interface device 530, can be configured to translate ingress and/or egress session control signals into one or more session control protocols based on data in a per-device database that indicates the protocol compatibility of a particular set of endpoints and/or IP-PBXs.

In some embodiments, an IP-PBX can be in communication with an endpoint such that session control signals and/or media signals transmitted between the IP-PBX and endpoint are not intercepted by an interface device. For example, an IP-PBX can be in communication with a first endpoint such that session control signals and/or media signals exchanged between the IP-PBX and the first endpoint are not received by an interface device. The IP-PBX can be configured to implement per-device services and per-call services associated with the first endpoint, if necessary. The interface device can be, however, disposed between a second endpoint and the IP-PBX such that interface device processes session control signals and/or media signals exchanged by the IP-PBX and the second endpoint. The interface device can be configured, for example, to perform all per-device services associated with the second endpoint.

Figure 6:
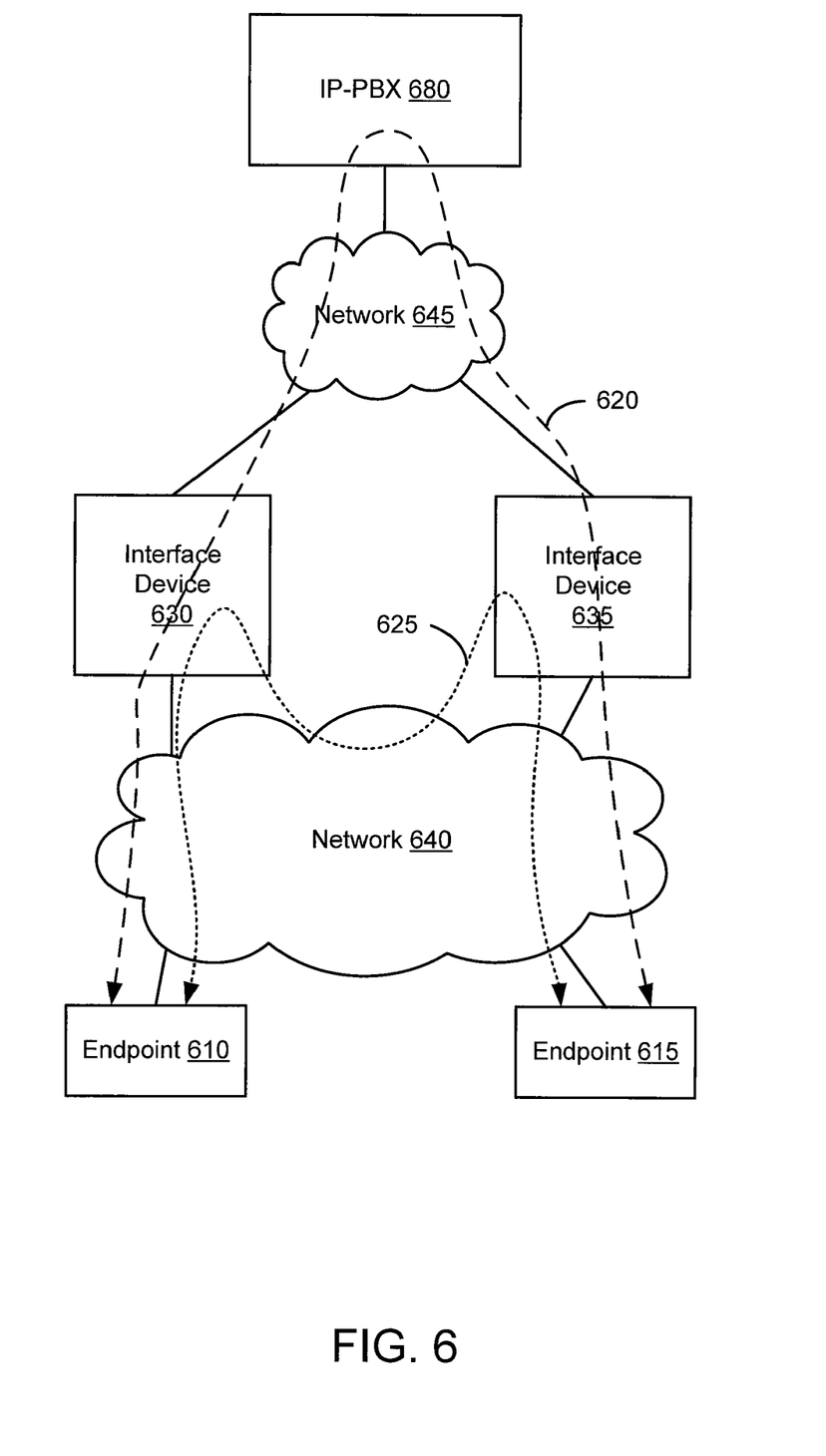
FIG. 6 is a schematic diagram that illustrates multiple interface devices in communication with and disposed between an IP-PBX and multiple endpoints, according to an embodiment of the invention.

FIG. 6 is a schematic diagram that illustrates interface devices 630 and 635 in communication with and disposed between an IP-PBX 680 and endpoints 610 and 615, according to an embodiment of the invention. Interface device 635 is configured to function as an interface between the IP-PBX 680 and endpoint 615, and interface device 630 is configured to function as an interface between the IP-PBX 680 and endpoint 610. The interface device 630 is configured to affect processing performed at the IP-PBX 680 by controlling session control signals and media signals transmitted between the IP-PBX 680 and the endpoint 610. Similarly, interface device 635 is configured to affect processing performed at/by the IP-PBX 680 by controlling session control signals and media signals transmitted between the IP-PBX 680 and the endpoint 615.

In this embodiment, media signals 625 originating at endpoint 610 are received at interface device 630 and sent to endpoint 615 via interface device 635. Media signals 625 originating at endpoint 615 are received at interface device 635 and sent to endpoint 610 via interface device 630. The interface devices 630 and 635 can be configured to modify or send the media signals 625 without modifying the media signals based on per-device data stored, for example, in a centrally accessible database (not shown) or stored locally within the interface devices 630 and 635, respectively. For example, interface device 630 or interface device 635 can convert the media signal 625 originating at endpoint 610 into a protocol that can be recognized by endpoint 615.

As shown in FIG. 6, the session control signals 620 originating at endpoint 610 are received at interface device 630 and sent to the IP-PBX 680 for processing before being sent to endpoint 615 from IP-PBX 680 via interface device 635. Session control signals 620 originating at endpoint 615 are received at interface device 635 and sent to the IP-PBX 680 for processing before being sent to endpoint 610 from IP-PBX 680 via interface device 630.

Some embodiments of the invention relate to a computer storage product with a computer-readable medium (also referred to as a processor-readable medium) having instructions or computer code thereon for performing various computer-implemented operations. The media and computer code may be those specially designed and constructed for the specific purpose or purposes. Examples of computer-readable media include, but are not limited to: magnetic storage media such as hard disks, floppy disks, and magnetic tape; optical storage media such as Compact Disc/Digital Video Discs ("CD/DVDs"), Compact Disc-Read Only Memories ("CD-ROMs"), and holographic devices; magneto-optical storage media such as floptical disks; carrier wave signals; and hardware devices that are specially configured to store and execute program code, such as Application-Specific Integrated Circuits ("ASICs"), Programmable Logic Devices ("PLDs"), and ROM and RAM devices. Examples of computer code include, but are not limited to, micro-code or micro-instructions, machine instructions, such as produced by a compiler, and files containing higher-level instructions that are executed by a computer using an interpreter. For example, an embodiment of the invention may be implemented using Java, C++, or other object-oriented programming language and development tools. Additional examples of computer code include, but are not limited to, control signals, encrypted code, and compressed code.

In conclusion, among other things, methods and apparatus related to an interface device configured to control signaling between an IP-PBX and an endpoint are described. While various embodiments of the invention have been described above, it should be understood that they have been presented by way of example only, and various changes in form and details may be made. For example, a single interface device can be configured to function as an interface between multiple IP-PBXs and/or multiple endpoints.

What is claimed is:

1. A method, comprising:
   receiving a media signal at an interface device in communication with and disposed between an Internet Protocol private branch exchange (IP-PBX) and a first endpoint, the media signal being associated with the first endpoint and being associated with a session established between the first endpoint and a second endpoint within a session over internet protocol network, the session being established at least in part by the IP-PBX based on a session control signal received at the interface device from the first endpoint and sent from the interface device to the IP-PBX, wherein the interface device is separate from the first and second endpoints, the media signal and the session control signal being sent from the first endpoint via an IP network;
   modifying the media signal at the interface device based on a per-device service associated with at least one of the first endpoint or the second endpoint; and
   providing the modified media signal from the interface device to the second endpoint in a manner that bypasses the IP-PBX.

2. The method of claim 1, wherein the interface device is a first interface device, the method further comprising:
   sending the modified media signal from the first interface device to a second interface device in communication with and disposed between the IP-PBX and the second endpoint.

3. The method of claim 1, wherein the per-device service is based on a first protocol associated with the first endpoint, the second endpoint is associated with a second protocol that is different than the first protocol.

4. The method of claim 1, wherein the session is a first session having a first portion,
   the method further comprising:
   selecting at the interface device the second endpoint from a plurality set of endpoints when a request to establish a second session between the interface device and a third endpoint is denied, the third endpoint being from the set plurality of endpoints; and
   establishing, in response to the selecting, a second portion of the first session between the interface device and the second endpoint.

5. The method of claim 1, wherein the interface device is a session layer device and the IP-PBX is an enterprise IP-PBX.

6. The method of claim 1, wherein the media signal is based on a media signal protocol associated with the first endpoint before the modifying, the media signal is based on a media signal protocol associated with the second endpoint after the modifying.

7. The method of claim 1, wherein the receiving is performed at a first time, the media signal is based on a media signal protocol associated with the first endpoint, the method further comprising:
   sending at a second time the media signal to the IP-PBX, the second time being after the first time, the modifying includes changing at a third time the media signal protocol associated with the first endpoint into a media signal protocol associated with the second endpoint, the third time being after the second time.

8. The method of claim 1, wherein the session control signal is based on a first protocol, the first protocol of the session control signal is translated at the interface device into a second protocol before the session control signal is sent from the interface device to the IP-PBX.

9. A method, comprising:
   receiving a session control signal and a media signal at a first interface device in communication with and disposed between an Internet Protocol private branch exchange (IP-PBX) and a source endpoint, the media signal and the session control signal being sent from the source endpoint via an IP network;
   sending the session control signal from the first interface device to the IP-PBX, the session control signal configured such that the IP-PBX establishes a portion of a session between the source endpoint and a destination endpoint within a session over internet protocol network when the IP-PBX receives the session control signal, wherein the first interface device is separate from the source and destination endpoints; and
   sending the media signal from the first interface device to at least one of a second interface device or the destination endpoint in a manner that bypasses the IP-PBX, the media signal being associated with the session.

10. The method of claim 9, further comprising:
    changing at a first time the session control signal such that the session control signal is based on a first protocol before the changing and based on a second protocol after the changing, the sending the session control signal includes sending at a second time after the first time, the second protocol being a session control protocol associated with the IP-PBX.

11. The method of claim 9, wherein the media signal is a first media signal, the method further comprising:
    changing at the first interface device the first media signal into a second media signal, the first media signal having a first content type, the second media signal having a second content type, the changing includes changing based on a per-device service that is associated with at least one of the source endpoint or the destination endpoint.

12. The method of claim 9, wherein the session is a first session, the portion of the first session is a first portion of the first session, the destination endpoint is a first destination endpoint,
    the method further comprising:
    selecting at the first interface device the first destination endpoint from a set of destination endpoints when a request to establish a second session between the interface device and a second destination endpoint from the set of destination endpoints is denied; and
    establishing in response to the selecting a second portion of the first session between the interface device and the first destination endpoint.

13. The method of claim 9, wherein the second interface device is in communication with and disposed between the IP-PBX and at least one of the destination endpoint or the source endpoint.

14. The method of claim 9, wherein per-device processing associated with the media signal is substantially performed at the first interface device and per-call processing associated with the session control signal is substantially performed at the IP-PBX.

15. The method of claim 9, further comprising:
modifying the media signal based on a per-device service associated with the destination endpoint such that the media signal is based on a first protocol associated with the source endpoint before the modifying and based on a second protocol associated with the destination endpoint after the modifying.

16. An apparatus, comprising:
an input port configured to receive a media signal associated with a first endpoint and a session control signal associated with the first endpoint, the session control signal being used to establish a session within a session over internet protocol network, the media signal being associated with the session, the media signal and the session control signal being sent from the first endpoint via an Internet Protocol (IP) network; and
a processor coupled to the input port, the processor configured to define a route of the media signal and a route of the session control signal such that per-device processing associated with the media signal is performed at a first device and per-call processing associated with the session control signal is performed at a second device separate from the first device;
wherein the second device comprises an internet protocol private branch exchange (IP-PBX) and wherein the first device disposed between the IP-PBX and the first endpoint provides the media signal to a second endpoint associated with the session in a manner that bypasses the IP-PBX, and is separate from the first and second endpoints.

17. The apparatus of claim 16, wherein the first device is an interface device in communication with and disposed between the first endpoint and the IP-PBX, the processor and the input port being included in the interface device.

18. The apparatus of claim 16, wherein the processor is included in the first device,
the apparatus further comprising:
a memory configured to store instructions associated with a per-device service used for performing the per-device processing, the processor configured to modify the media signal based on the per-device service.

19. The apparatus of claim 16, wherein the session control signal is based on a first protocol when received at the input port, the processor is configured to modify the session control signal such that the session control signal is based on a second protocol after being received at the input port, the first protocol is associated with the first endpoint and the second protocol is associated with the at least one of the first device or the second device.

\* \* \* \* \*